United States Patent [19]
Lubin

[11] 3,823,803
[45] July 16, 1974

[54] NUT TRANSFER AND ORIENTING DEVICE
[75] Inventor: Arnold I. Lubin, Southfield, Mich.
[73] Assignee: Multifastener Corporation, Detroit, Mich.
[22] Filed: Dec. 26, 1972
[21] Appl. No.: 317,963

[52] U.S. Cl. .............................. 193/43 A, 221/158
[51] Int. Cl. ...................... B65g 11/20, B65g 11/16
[58] Field of Search ................................. 193/43 A; 221/157-162

[56] References Cited
UNITED STATES PATENTS
| | | | |
|---|---|---|---|
| 1,080,996 | 12/1913 | Perkins | 221/161 |
| 1,408,497 | 3/1922 | Bragdon | 193/43 B |
| 1,644,999 | 10/1927 | Hardiman | 193/43 A |
| 2,523,278 | 9/1950 | Carl | 193/43 A |
| 2,711,550 | 6/1955 | Nielsen | 221/160 X |
| 2,728,091 | 12/1955 | Hoenk | 221/159 X |

*Primary Examiner*—Evon C. Blunk
*Assistant Examiner*—W. Scott Carson

[57] ABSTRACT

A transfer mechanism receiving nuts having a reduced pilot portion extending perpendicular to the transfer axis, separating and transferring the nuts according to the pilot position. The transfer mechanism includes an inlet passage receiving and guiding the nuts in two pilot orientations and two outlet passages each configured to receive and transfer the nuts in only one pilot orientation, in a continuous flow.

6 Claims, 6 Drawing Figures

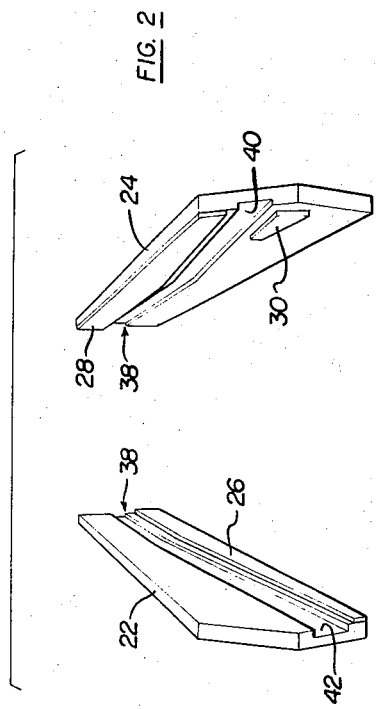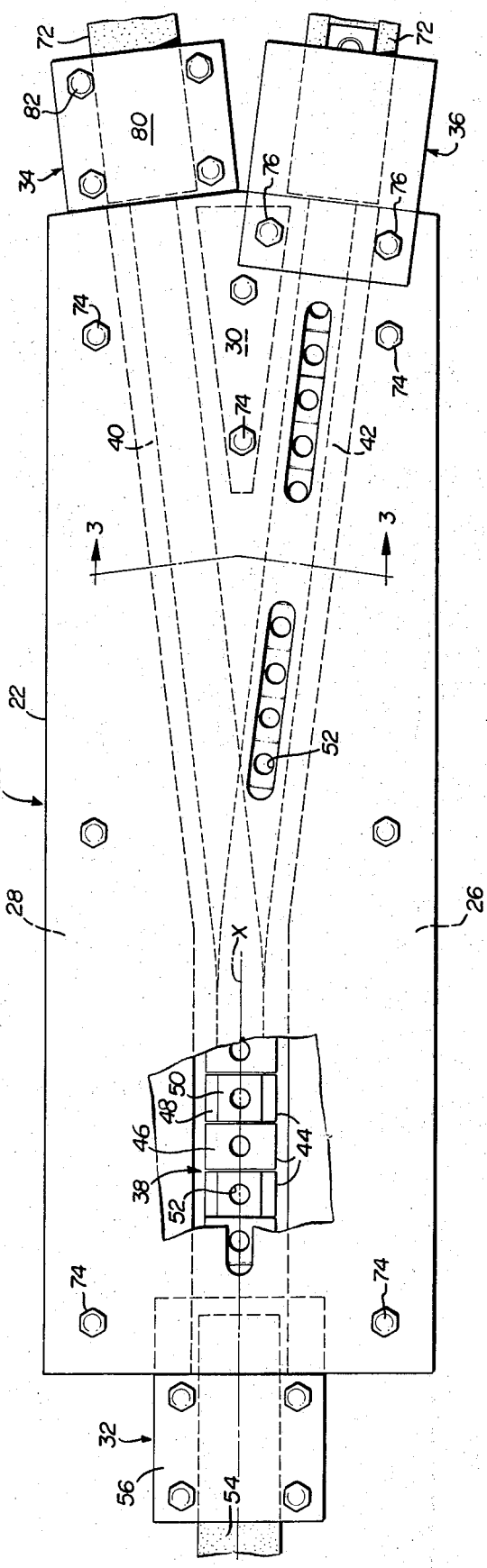

NUT TRANSFER AND ORIENTING DEVICE

FIELD OF THE INVENTION

The nut transfer and orienting device of this invention is adapted to separate and divert nuts according to their orientation in the inlet passage. The nuts are received from a hopper, or the like, with the pilot portion of the nut oriented up and down and the transfer mechanism separates the nuts, continuously, into two outlet passages.

The nut transfer and orienting device of this invention is particularly, although not exclusively adapted to transfer nuts from a source, such as a hopper, to a working station requiring a particular nut orientation. The transfer mechanism is suitable for transferring and orienting nuts which are asymmetric about the transfer axis. The disclosed nuts have a base or flange portion and a reduced pilot portion, such as a pierce or clinch nut, however other parts may also be transferred and segregated by the improved transfer and orienting device of this invention. The disclosed nut is similar to the pierce and clinch nut disclosed in U.S. Pat. No. 3,152,628, which is assigned to the assignee of the instant application.

In a conventional method of manufacturing pierce nuts, for example, the nuts are fed to a rotary hopper after rolling the nut cross-section, piercing the aperture and cutting the individual nuts from the rolled strip. The nuts are then fed through chutes to a tapper, where the aperture is threaded and then stored. The tapper requires a particular nut orientation and therefore the present rotary hopper is designed to feed nuts to the outlet chute in only one orientation. The nuts which are not oriented as required by the tapper are returned to the rotary hopper. The nut orienting and transfer mechanism of this invention is adapted to accept nuts in two orientations and continuously separate the nuts according to their orientation to substantially double the output of the hopper and reduce the tumbling of the nuts in the hopper.

SUMMARY OF THE INVENTION

As stated above, the nuts to be transferred by the nut orienting and transfer mechanism of this invention are preferably asymetric about one axis perpendicular to the axis of transfer. Each of the nuts has a laterally extending flange or base portion and a reduced pilot portion extending perpendicular to the transfer axis. The nuts are fed to the transfer mechanism from a hopper, or the like, with the pilot portion extending up or down, to an inlet passage. It is understood that "up and down" are relative terms and are chosen herein merely to define the relative position of the pilot portion and the orientation of the nuts in the transfer mechanism. The nuts may be fed vertically from the hopper, for example, however the relative orientation will remain the same.

The transfer mechanism includes an inlet passage receiving the nuts to be transferred in both a pilot up and pilot down orientation. The inlet passage may be characterized as cruciform-shaped, being generally rectangular in cross-section and having oppositely extending lateral channels near the center of the passage receiving the nut flanges or base portion. The nuts are thereby guided in the inlet passage in either orientation to at least two outlet passages communicating with the inlet passage. Each of the outlet passages includes a pair of oppositely extending lateral channels which communicate with the lateral channels of the inlet passage and receive the flange or base portion of the nut. The outlet channels are, however, configured to receive the nuts in only one orientation, segregating or separating the nuts according to their orientation. The lateral channels of one of the outlet passages is located adjacent the top of the channel, receiving only the nuts oriented with the pilot portion down. The lateral channels of the other outlet passage are located adjacent the bottom of the passage, receiving only the nuts oriented with the pilot portion up.

In the preferred embodiment, the inlet and outlet passages define a Y-shaped passage with the inlet passage smoothly blending with the outlet passages to provide continuous separation of the nuts according to their orientation.

In the preferred embodiment, the entrance to the inlet passage includes at least two inclined ramps on either side of the passage to guide the base portion of the nut into the lateral channels. The disclosed embodiment includes two pair of inclined ramps to guide the nut in either orientation. The transfer mechanism is formed of two body portions. The channels which receive the pilot portion of the nut are formed in the body portions and the body portions are spaced by shims which provide the opposed lateral channels receiving the flanges or base portion of the nut. This embodiment may be adjusted by increasing or decreasing the width of the shims to accommodate different sized nuts.

The nut orienting and transfer mechanism of this invention may be connected to the outlet chute of a hopper, as described above, which feeds the nut in either pilot position. Experimentation with the disclosed transfer mechanism proves that the mechanism will substantially double the outlet of the hopper and reduce the rejection rate of nuts caused by tumbling of the nuts in the rotary hopper. Other advantages and meritorious features of this invention will more fully appear from the following description of the preferred embodiment, the appended claims and the drawings.

BRIEF DESCRIPTION OF THE DRAWINGS

FIG. 1 is a top elevation of one embodiment of the nut transfer and orienting device of this invention;

FIG. 2 is an exploded end view of the nut transfer and orienting device shown in FIG. 1 with the guide chutes removed;

DESCRIPTION OF THE PREFERRED EMBODIMENT

Figure 3:
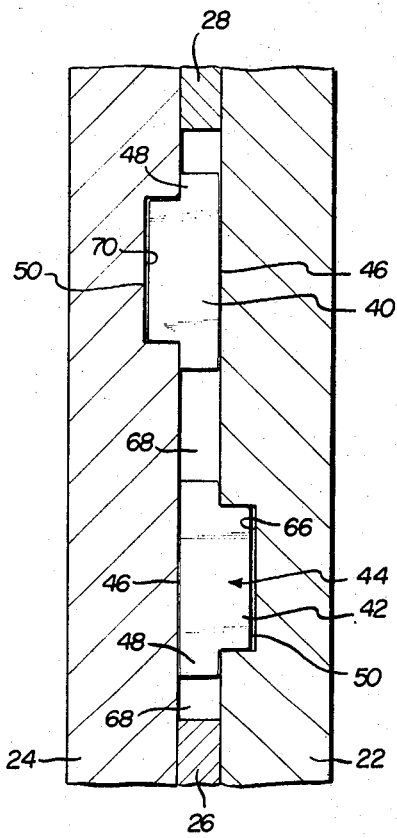
FIG. 3 is an end cross-sectional view of FIG. 1 in the direction of view arrows 3—3.

The disclosed transfer mechanism 20 includes two body portions 22 and 24, as shown in FIG. 2. The body portions are separated by shims 26, 28 and 30 for the purposes described below. The nuts to be transferred and separated are received in the inlet track 32 from a nut hopper or the like, not shown, and the nuts are distributed to the point of use through outlet tracks 34 and 36, as shown in FIG. 1.

As described above, the transfer mechanism includes an inlet passage 38 and two outlet passages 40 and 42 which, in combination, define a Y-shaped passage as shown in phantom in FIG. 1. The nuts 44 to be transferred in the disclosed mechanism include a base portion 46, as shown in FIG. 3, having a pair of opposed flanges 48 and a reduced pilot portion 50. The nuts are generally rectangular, as shown in FIG. 1 and described in the above referenced U.S. patent. It will be understood that the transfer mechanism of this invention may be utilized to transfer various parts, including circular nuts and other asymmetric parts, wherein the parts are to be separated according to their orientation relative to the transfer axis $x$.

The nuts are fed to the inlet passage 38 through chute 54. The chute may be secured to the transfer mechanism by any suitable means, including the bracket 56 shown in FIGS. 1 and 5 and described below. For example, the nuts may be fed from a rotary hopper, not shown, which aligns the nuts with the long face perpendicular to the transfer axis $x$, as shown in FIG. 1. The pierce nuts shown in the drawings are conventionally formed by rolling the cross-section of the nut from a metal strip, piercing the aperture 52 and severing the nuts from the strip. The next step in the operation is to tap the aperture, forming a threaded bore for receipt of a male fastener, or the like. The tapping machine must, however, receive the nuts in a particular pilot orientation and the transfer mechanism of this invention is adapted to feed the nuts with the pilot portion oriented either up or down relative to the transfer axis. In conventional apparatus, the rotary hopper is adapted to return any nuts which are not oriented as required by the tapper to the hopper, requiring additional tumbling of the nuts in the hopper for orientation. The transfer mechanism of this invention, thus doubles the output of the hopper and reduces the tumbling of the nuts in the hopper.

Figure 5:
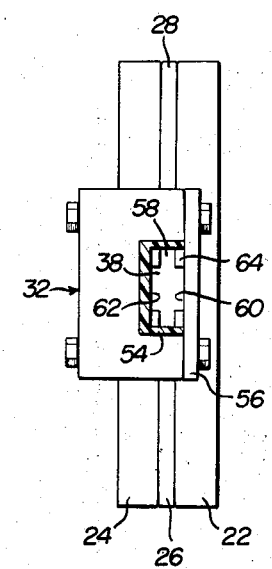
FIG. 5 is an end view of the transfer mechanism shown in FIG. 1, showing the inlet passage.

The inlet passage 38 is generally cruciform-shaped, as shown in FIG. 5, receiving and transferring the nuts with the pilot portion up and down, as shown in FIG. 1. The inlet passage includes oppositely extending lateral channels 58, as shown in FIG. 5, which receive the flanges 48 of the nuts, an upper channel 62 which receives the pilot portion of the nut if the nut is positioned with the pilot extending upwardly and a lower channel 60 which receives the pilot portion of the nut if the nut is positioned with the pilot portion extending downwardly. It is understood that "up" and "down" are relative terms and are intended herein merely to define the relative position of the pilot portion in the passages. The transfer mechanism may be positioned vertically, for example, however the relative position of the pilot portion will remain the same.

Figure 6:
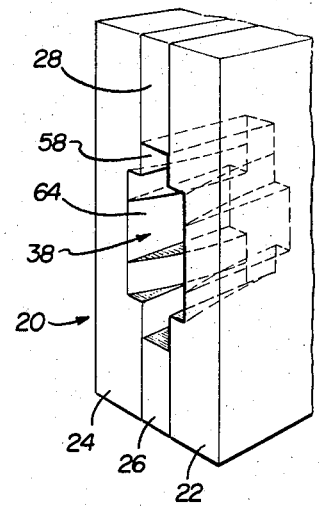
FIG. 6 is an end perspective view of the transfer mechanism shown in FIG. 1 with the guide chute removed.

In the preferred embodiment of the transfer mechanism, the entrance to the inlet passage is rectangular, as shown by the inlet chute 54, and the inlet passage includes two pair of inclined ramps 64 which guide the base or flange portion of the nut into the lateral channels 58. The inclined ramps are best shown in FIG. 6, wherein the ramps 64 extend from the rectangular entrance opening to the walls of the lateral channels, positioning the nut with either the pilot portion up or down in the inlet passage. The ramps may be either arcuate or flat, depending upon the configuration of the part being transferred.

The nuts are transferred through the inlet passage to the intersection between the inlet passage and the outlet passages 40 and 42. The nuts in the disclosed embodiment are transferred by the force of the incoming nuts, upstream of the nuts in the transfer mechanism. Parts may also be transferred in the part orienting and transfer mechanism of this invention by gravity or fluid pressure, depending upon the particular application. At the intersection between the outlet passages and the inlet passage, the nuts are separated according to the orientation of the pilot portion, as described below.

The configuration of the outlet passages is shown in FIG. 3. Outlet passage 42 is defined by a channel 66 in the lower body portion 22 of the transfer mechanism, which communicates with the lower channel 60 of the inlet passage and lateral channels 68 communicate with the lateral channels 58 of the inlet passage. It will be noted that the lateral channels are defined by the shims or spacers 26 and 28 located between the body portions of the transfer mechanism and therefore the width of the lateral channels may be adjusted by adjusting the width of the shims. Outlet passage 40 is defined by a channel 70 in the upper body portion 24 of the transfer mechanism and the lateral channels 68 of the passage are similarly defined by the shims 26 and 28, as described above.

The nuts in the inlet passage with the pilot portion 50 extending downwardly are received in the outlet passage 42, as shown in FIG. 3, because the channel 66 is a continuation of the lower inlet channel 60 and nuts positioned with the pilot portion extending upwardly are received in outlet passage 40 because channel 70 is a continuation of the upper inlet channel 62. The outlet channels thus separate the lower and upper inlet channels, 60 and 62 respectively, at an acute angle, as shown in FIG. 1, permitting the nuts to be continuously separated according to the position of the pilot portion.

Figure 4:
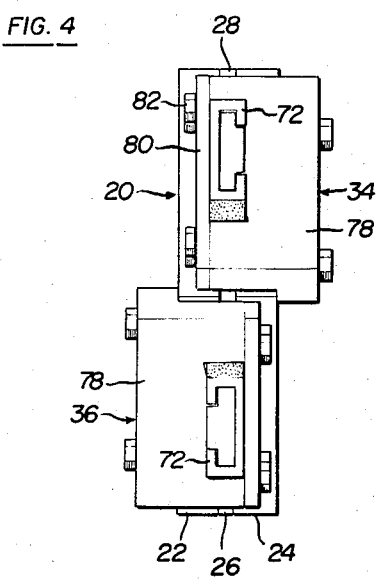
FIG. 4 is an end view of the transfer mechanism shown in FIG. 1 showing the outlet passages.

The nuts are discharged from the outlet passages into U-shaped chutes 72, as shown in FIGS. 1 and 4, for transfer to the next work station. In the preferred embodiment, the chutes are relatively flexible, such as plastic. The nuts in one chute may then be oriented to the position in the other chute by forming a loop in that chute, for example.

The body portions 22 and 24 of the transfer mechanism may be secured by any suitable means, including the bolts 74. It will be noted that the bolts 74 are also positioned to secure the spacer shims 26, 28 and 30. The brackets 32, 34 and 36 are also secured to the transfer mechanism, in the disclosed embodiment, by suitable bolts 76. The brackets in the disclosed embodiment each include a body portion 78 and a plate 80 which secures the chutes within the bracket. The body portion and plate are secured by suitable bolts 82.

In operation, the nuts are received from a source through inlet chute 54 with the pilot portion 50 of the nut extending perpendicular to the transfer axis $x$. The nuts are oriented with the pilot portion extending up and down relative to the transfer axis. The nuts are then received in the inlet passage 38, which includes inclined ramps 64 which guide the base or flange portion 48 of the nuts into the oppositely extending lateral channels 58. If the pilot portion of a nut extends upwardly, the pilot is received in the upper channel 62 of the inlet passage. If the pilot extends downwardly, it is received in the lower channel 60 of the inlet passage. The nuts are then transferred into one of the outlet passages 40 and 42, depending upon the orientation of the pilot portion. If the pilot portion extends downwardly, the nut is received in outlet passage 42 because the outlet channel 66 communicates with inlet channel 60. If the nut is positioned with the pilot extending upwardly, the nut is received in passage 40, because outlet channel 70 communicates with the upper inlet channel 62. The nuts are therefore continuously separated according to the orientation of the pilot portion, without interruption.

It will be understood that various modifications may be made to the transfer mechanism disclosed herein, without departing from the purview of the appended claims. For example, in the disclosed transfer mechanism, the body portions 22 and 24 and the shims 26, 28 and 30 are formed of metal, such as stainless steel. This material has been chosen because the pierce nuts to be transferred are formed of metal. It may be desirable to use a friction resistant plastic, such as Nylon, or a softer plastic material may be utilized if non-metallic parts are transferred. Further, the configuration of the passages is dependent upon the shape of the parts to be transferred and may be modified for a particular application.

I claim:

1. An apparatus for separating and transferring articles, said articles having an enlarged base portion and a reduced pilot portion projecting generally perpendicular from one side of said enlarged base, said apparatus comprising:

a first body portion having an inlet and outlet end and a confronting face;

a second body portion having an inlet and outlet end and a confronting face;

said first and second body portions being substantially identical and releasably connected such that the respective confronting faces are generally parallel and confronting and further such that said inlet and outlet ends are generally aligned, respectively;

each body portion having an indented channel with a base in its confronting face, said channels being similarly configured to accommodate the pilot portions of said articles and extending from a respective inlet end to a respective outlet end of said body confronting faces;

the confronting faces of said body portions being spaced apart a distance slightly greater than the height of the article base portion to define a region for accommodating the base portion of said articles;

each of said channels having a pair of ramps in the region of the body inlet end, each ramp of each said pair being on opposed sides of each respective channel base and being spaced a distance at least equal to the width of said pilots, each of said ramps including a gradually tapering surface from generally flush with said channel base at the inlet ends of said bodies to flush with the confronting faces of each said body, whereby the ramps guide the base of said article into said region accommodating the article base and the pilots of said articles into one of the channels;

the axes of the respective channels at the inlet ends of said portions lying within a plane perpendicular to the parallel confronting faces at said inlet ends, such that said channels are juxtaposed so that said apparatus may receive articles oriented with a pilot portion projecting toward either said first body and into said first body channel or with a pilot portion projecting toward said second body and into said second body channels;

the axes of said channels diverging from the co-planar arrangement in the direction of said outlet end such that said channels at said respective outlet ends are separated to define separate and distinct outlets for the articles entering and traversing said apparatus, said channels guiding the articles having pilots projecting therein such that said articles may be separated within said apparatus;

means feeding articles to said apparatus with pilots projecting randomly toward either said first or second body portions; and means communicating with each respective separate channel outlet (1) receiving said separated and differently oriented groups of articles and (2) bypassing said feed means.

2. The separating and transfer mechanism defined in claim 1, characterized in that said channels diverge gradually such that the articles may be transferred without interruption from the inlet end of said body portions, through the apparatus and to the separate and distinct outlets.

3. The separating and transfer mechanism defined in claim 1, characterized in that said channels define a Y-shaped passageway through said apparatus, the leg of said Y formed by the channels in the inlet region where the channels axes lie in said plane.

4. The separating and transfer mechanism defined in claim 1, characterized in that said feeding means includes a rectangular chute communicating with and guiding said articles into the inlet ends of said channels.

5. The separating and transfer mechanism defined in claim 1, characterized by a plurality of shims located between said body portions to define the region accommodating the base portion of the articles and permitting adjustment of the body portions to accommodate different size articles.

6. The separating and transfer mechanism defined in claim 1, characterized in that the means receiving said articles from the separate and distinct outlets includes a pair of chutes, said chutes being relatively flexible.

* * * * *